US007490253B2

(12) United States Patent
Yoshioka et al.

(10) Patent No.: US 7,490,253 B2
(45) Date of Patent: Feb. 10, 2009

(54) DISPLAY DEVICE WITH POWER SAVING MODE BASED ON DETECTED ILLUMINANCE

(75) Inventors: Kazuo Yoshioka, Tokyo (JP); Tomohiro Nakagawa, Tokyo (JP); Yoshiyuki Shirasaki, Tokyo (JP); Takashi Katagiri, Tokyo (JP)

(73) Assignee: NEC - Mitsubishi Electric Visual Systems Corp., Tokyo (JP)

( * ) Notice: Subject to any disclaimer, the term of this patent is extended or adjusted under 35 U.S.C. 154(b) by 401 days.

(21) Appl. No.: 11/092,797

(22) Filed: Mar. 30, 2005

(65) Prior Publication Data

US 2006/0136762 A1 Jun. 22, 2006

(30) Foreign Application Priority Data

Dec. 20, 2004 (JP) ............................ 2004-367453

(51) Int. Cl.
*G06F 1/00* (2006.01)
*G06F 1/32* (2006.01)
*G06F 11/30* (2006.01)
*G09G 3/36* (2006.01)

(52) U.S. Cl. ....................... 713/320; 713/300; 713/340; 345/87

(58) Field of Classification Search ................. 713/310, 713/320, 300, 324; 345/68, 212, 87
See application file for complete search history.

(56) References Cited

U.S. PATENT DOCUMENTS 5,511,201 A * 4/1996 Kamimaki et al. .......... 713/310
5,760,760 A * 6/1998 Helms ........................ 345/102
6,020,879 A * 2/2000 Nakabayashi ............... 345/212
6,140,987 A * 10/2000 Stein et al. .................... 345/87
6,418,536 B1 * 7/2002 Park .......................... 713/323
6,522,314 B1 * 2/2003 Tomio et al. .................. 345/68
6,677,924 B2 * 1/2004 Nakayama ................... 345/92
6,870,529 B1 * 3/2005 Davis ......................... 345/207
2003/0206163 A1 11/2003 Kee
2004/0004608 A1 * 1/2004 Lin ............................ 345/207
2005/0071702 A1 * 3/2005 Morisawa ................... 713/320
2005/0156949 A1 * 7/2005 Tsou .......................... 345/690
2005/0190142 A1 * 9/2005 Ferguson .................... 345/102
2006/0125769 A1 * 6/2006 Ding .......................... 345/102
2006/0192748 A1 * 8/2006 Lowles et al. ............... 345/102
2007/0195074 A1 * 8/2007 Gelissen ..................... 345/204

OTHER PUBLICATIONS

VESA Video Electronics Standards Association, "Display Power Management (DPM) Standard", Release A, Mar. 3, 2003, pp. 1-10.

* cited by examiner

*Primary Examiner*—Thomas Lee
*Assistant Examiner*—Ji H Bae
(74) *Attorney, Agent, or Firm*—Birch, Stewart, Kolasch & Birch, LLP

(57) ABSTRACT

An illuminance sensor detects an illuminance value for an environment in which a display device is placed and provides the illuminance value to a controller. The controller determines whether to cause the display device to make a transition to a power saving mode or not in accordance with the illuminance value inputted thereto. For the transition to the power saving mode, the controller stops the operation of a backlight drive signal generator to turn off a backlight unit, and stops the supply of power and a display signal to a liquid crystal panel.

5 Claims, 1 Drawing Sheet

DISPLAY DEVICE WITH POWER SAVING MODE BASED ON DETECTED ILLUMINANCE

BACKGROUND OF THE INVENTION

1. Field of the Invention

The present invention relates to a display device having a power saving feature which controls power consumption in accordance with conditions.

2. Description of the Background Art

At the present time, almost all display devices such as liquid crystal displays used with connection to computer devices have a power saving feature compliant with the DPMS (Display Power Management Signaling) standard established by VESA (Video Electronics Standards Association) which is an organization for standardization of standards of graphic equipment associated with computer devices.

The DPMS is a standard relating to the power management of display devices. A DPMS-compliant device automatically makes a transition to a power saving mode from a normal mode and a transition to the normal mode from the power saving mode in accordance with the conditions of a computer device connected thereto.

The term "normal mode" refers to an operating state in which text, graphics and the like are displayed in a user-recognizable manner in response to signals supplied from the computer device by using supplied electric power. The term "power saving mode," on the other hand, refers to an operating state in which power consumption of the display device is reduced by not using supplied electric power (or by reducing the use of the supplied electric power).

The switching between the normal mode and the power saving mode is controlled based on the judgment of the display device as to whether there are signals supplied from the computer device or not.

Concretely, the display device identifies the type of synchronization signals supplied (or not supplied) from the computer device to the display device among horizontal and vertical synchronization signals, and performs the switching between the normal mode and the power saving mode based on the DPMS standard in response to the identified synchronization signal (see the URL http://www.vesa.org).

SUMMARY OF THE INVENTION

The present invention is intended for a display device used with connection to a computer device, the display device being operative in a power saving mode requiring lower power consumption during operation than a normal mode.

According to the present invention, the display device comprises: an illuminance sensor for detecting the illuminance of an environment in which the display device is placed, and outputting an illuminance value indicating the detected illuminance; and a controller for changing an operating mode to the power saving mode independently of an input signal from the computer device when the illuminance value is lower than a predetermined illuminance value.

This reduces the power consumption in the display device in accordance with the illuminance of the environment in which the display device is placed, independently of the operation status or power management conditions of the computer device connected to the display device.

Preferably, the display device further comprises means for setting the predetermined illuminance value at any value, the predetermined illuminance value being used by the controller for comparison with the illuminance value detected by the illuminance sensor.

This allows a change in the illuminance value at which the transition to the power saving mode is made in accordance with the illuminance of the environment in which the display device is placed.

Preferably, the controller includes means for disabling or enabling a control function which changes the operating mode to the power saving mode in accordance with the illuminance of the environment in which the display device is placed.

This allows the use of the display device in the normal mode in the environment in which the transition to the power saving mode should be made.

It is therefore an object of the present invention to reduce power consumption in a display device in accordance with judgment of the display device itself, independently of the operating state of a computer device.

These and other objects, features, aspects and advantages of the present invention will become more apparent from the following detailed description of the present invention when taken in conjunction with the accompanying drawings.

DESCRIPTION OF THE PREFERRED EMBODIMENTS

<Construction of Display Device>

Figure 1:
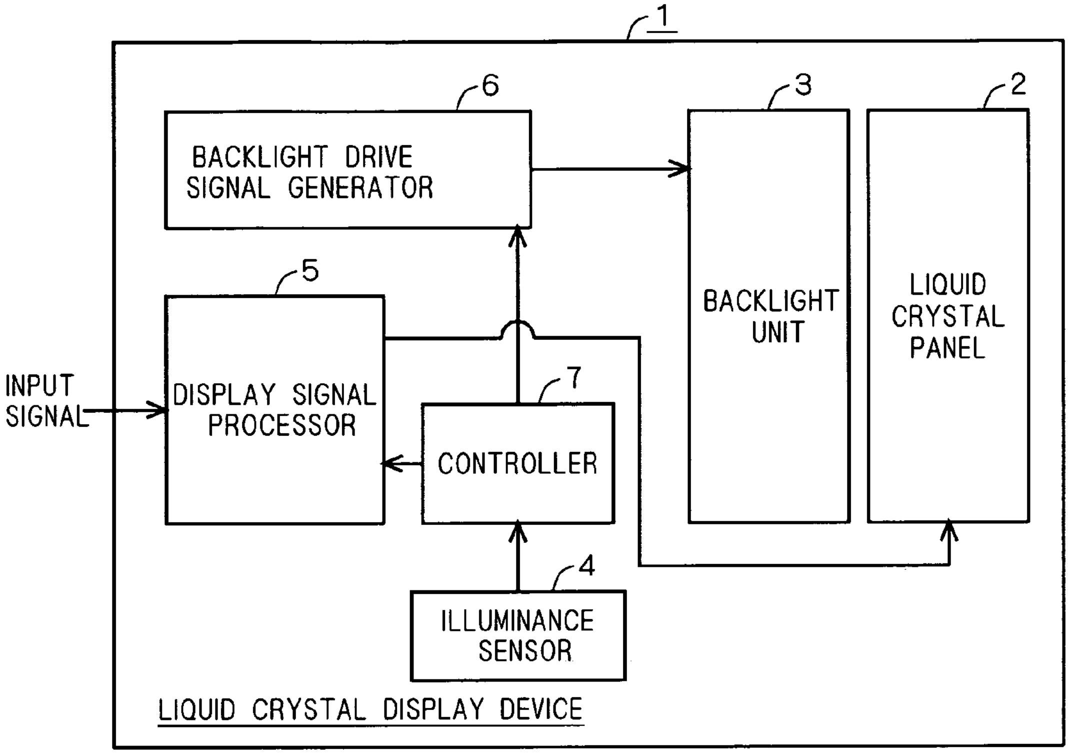
FIG. 1 is a block diagram showing the construction of principal parts of a display device according to a preferred embodiment of the present invention.

FIG. 1 is a block diagram showing a principal construction of a display device 1 according to a preferred embodiment of the present invention. As shown in FIG. 1, the display device 1 includes a liquid crystal display device with a liquid crystal panel 2 provided on the front of a backlight unit 3;

The display device 1 further includes an illuminance sensor 4 for detecting the illuminance of an environment in which the display device 1 is placed, a display signal processor 5 for converting an input signal from a computer device and the like (not shown) connected to the display device 1 to proper format and providing the converted signal to the liquid crystal panel 2, a backlight drive signal generator 6 for generating a drive signal of the backlight unit 3, and a controller (control means) 7 for performing centralized control of the overall operation of the display device 1.

A signal provided from the computer device and the like is inputted as an input signal to the display signal processor 5. The display signal processor 5 converts the input signal into a signal format displayable on the liquid crystal panel 2 and outputs the converted signal to the liquid crystal panel 2. The backlight drive signal generator 6 generates the backlight drive signal for accomplishing a brightness desired by a user and outputs the backlight drive signal to the backlight unit 3. These operations allow the display of text, graphics and the like inputted from the computer device and the like on the display device 1. The operating state as mentioned above in which a display corresponding to the input signal from the computer device is produced in a user-browsable manner is referred as a normal mode.

The illuminance sensor 4 has the function for detecting the illuminance of the ambient environment in which the display device 1 is placed and supplying a result of the detection as illuminance data to the controller 7. The illuminance sensor 4 operates independently of the state of the input signal from the computer device and the like, that is, without being influenced by the computer device and the like to which the display device 1 connected.

The controller 7 recognizes an illuminance value for the environment in which the display device 1 is placed from the illuminance data inputted from the illuminance sensor 4 and compares the illuminance value with a predetermined illuminance value (hereinafter referred as a reference illuminance value). When the illuminance value is lower than the reference illuminance value, the controller 7 changes the operating state of the display device 1 to a power saving mode in which the operation of the backlight drive signal generator 6 and the supply of power and a display signal to the liquid crystal panel 2 are stopped. In other words, the controller 7 has the function of making a comparison between the illuminance of the environment around the display device 1 detected by the illuminance sensor 4 and the reference illuminance value and controlling the operating modes of the display device 1 in accordance with the result of the comparison.

<Setting of Operation Mode of Display Device>

The user can set and change the reference illuminance value according to which the operation of the display device 1 is shifted to the power saving mode. The reference illuminance value set by the user is stored in the controller 7. A specific method of setting the reference illuminance value will be described below.

First, the user adjusts the illuminance of the environment in which the display device 1 is placed to illuminance at which the user wants to perform the transition to the power saving mode.

Next, when the user manipulates a manipulator (not shown) consisting of a button and the like on the display device 1 to start the setting operation, the illuminance value detected by the illuminance sensor 4 appears in the form of an on-screen display on the display device 1.

Referring to the illuminance value displayed, the user manipulates the manipulator to set the reference illuminance value. The reference illuminance value may be set to any value. For example, the reference illuminance value may be equal to the illuminance value appearing in the on-screen display or be set with a certain margin provided thereto.

The user can also enable or disable the function of automatic transition to the power saving mode. When the function of automatic transition to the power saving mode is disabled, even in the ambient environment in which the illuminance value is lower than the reference illuminance value, the controller 7 does not perform the control operation for changing the operation mode of the display device 1 to the power saving mode as mentioned above and the display device 1 continues operating in the normal mode.

Figure 2:
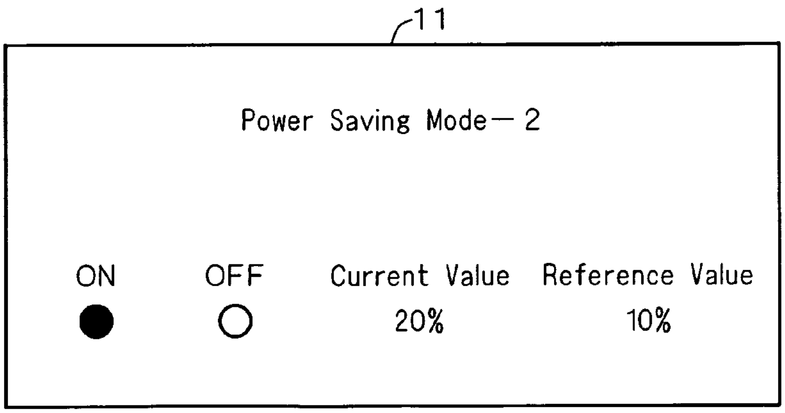
FIG. 2 shows an example of an on-screen display on the display device according to the preferred embodiment of the present invention.

FIG. 2 shows an example of the on-screen display according to the above-mentioned setting manipulation. The on-screen display 11 has a left-hand portion showing whether the function of automatic transition to the power saving mode is enabled or disabled, and a right-hand portion showing the illuminance ("current value" in FIG. 2) of the environment in which the display device 1 is placed and the reference illuminance value ("reference value" in FIG. 2) set as a reference value for the transition to the power saving mode. By manipulating the manipulator of the display device 1 with reference of this on-screen display the user can enable or disable the transition control of the operating modes and also can change the reference illuminance value.

In FIG. 2, the current value is shown as indicating "20%" and the reference illuminance value is shown as indicating "10%". In this condition, the display device 1 does not make the transition to the power saving mode but operates in the normal mode because the current value (i.e., the illuminance of the environment in which the display device 1 is placed) is higher than the reference value (i.e., the illuminance at which the user wants to change the operation mode of the display device 1 to the power saving mode). If the user wants the transition to the power saving mode at this illuminance, the user manipulates the manipulator to change the reference illuminance value to 20% or higher. For example, if the reference illuminance value is set at 25%, the operation mode of the display device 1 is shifted to the power saving mode because the current value is lower than the reference illuminance value.

To return the operation mode of the display device 1 to the normal mode while operating in the power saving mode, the user manipulates the manipulator used in setting the reference illuminance value. For example, pressing a predetermined button causes the operation mode of the display device 1 to return to the normal mode from the power saving mode easily.

The reference illuminance value and the like may be set in such a manner that the user manipulates the computer device by means of a software program and the like operating on the computer device connected to the display device 1, as well as in the above-mentioned manner which uses the manipulator provided on the display device 1.

Similarly, the manipulation for returning to the normal mode from the power saving mode may be performed in such a manner that the user manipulates the computer device connected to the display device 1, as well as in the manner which uses the manipulator provided on the display device 1. Specifically, the user may perform predetermined manipulation on an input device including a keyboard, a mouse and the like constituting the computer device to return the display device 1 to the normal mode from the power saving mode.

Additionally, the current value and the reference value in the on-screen display may be indicated by the format such as numerical value in lux or the like which is the unit of illuminance or graphics including a meter, a bar graph and the like if the user can make the comparison between the current value and the reference value, as well as being indicated in percent as mentioned above.

As described above, the user can recognize the illuminance of the environment in which the display device 1 is placed in real time by means of the on-screen display. The user can, therefore, set the desired reference illuminance value easily.

Further, the user can easily perform the manipulation for disabling the function of automatic transition to the power saving mode and the manipulation for returning the operation mode of the display device 1 to the normal mode during operation in the power saving mode. The user can, therefore, utilize the display device 1 in accordance with a variety of applications and situations.

<Operation of Display Device>

Next, operation of the display device 1 will be described. It is assumed that the display device 1 is connected to the computer device operating continuously day and night and that the reference illuminance value is set higher than the illuminance value measured when the lighting in a room in which the display device 1 is placed is OFF.

In this case, the display device 1 operates in the normal mode under condition that the illuminance value detected by the illuminance sensor 4 is higher than the reference illuminance value, during the daytime and also during the night with the lighting in the room being ON. This enables the user to browse a contents displayed on the display device 1 in response to the input signal from the computer device to identify what is processed by the computer device. If the computer device itself enters a power saving mode, the display device 1 is permitted to perform automatic switching between the normal mode and the power saving mode in conformity with the DPMS standard. However, the computer device connected to the display device 1 operates continuously and always provides the input signal to the display device 1. Therefore, the display device 1 continues operating in the normal mode.

The lighting in the room is turned OFF when the user leaves the room in which the display device 1 is placed after finishing his/her task. When this change in illuminance causes the illuminance value detected by the illuminance sensor 4 to be lower than the reference illuminance value, the operation mode of the display device 1 is automatically shifted to the power saving mode. In this process, the display device 1 automatically makes the transition to the power saving mode based on the result of judgment about the illuminance even when the computer device connected to the display device 1 is under conditions of continuous operation and continues providing the input signal to the display device 1.

When the user wants to return the operation mode of the display device 1 to the normal mode, the user can perform it by manipulating the manipulator provided on the display device 1 as mentioned above. Alternatively, when the illuminance detected by the illuminance sensor 4 becomes higher than the reference illuminance value because the lighting in the room is turned ON or because of other reasons, the operation mode of the display device 1 may be automatically returned to the normal mode from the power saving mode by the controller 7 which recognizes that condition.

The function of making the transition to the power saving mode may be disabled, as mentioned above, if the user wants to operate the display device 1 in the normal mode independently of the illuminance in the room.

As described above, the operation mode of the display device 1 is automatically shifted to the power saving mode without a manual operation by user such as selection of the operating mode on the display device 1 even while the computer device connected to the display device 1 is active. This reduces wasteful power consumption in the display device 1. As a result of this, for instance, when tens of such display devices 1 are in operation in a single room, changing the illuminance in this room enables all of the display devices 1 to make the transition to the power saving mode easily.

Although the liquid crystal display device is taken as an example of the display device 1 in this preferred embodiment, the present invention is not limited to this. Similar effects are produced if other display devices such as a CRT and the like are used.

While the invention has been described in detail, the foregoing description is in all aspects illustrative and not restrictive. It is understood that numerous other modifications and variations can be devised without departing from the scope of the invention.

What is claimed is:

1. A display device used with connection to a computer device, said display device being operative in a power saving mode requiring lower power consumption during operation than a normal mode, said display device comprising:

an illuminance sensor for detecting the illuminance of an environment in which said display device is placed and outputting an illuminance value indicating the detected illuminance;

a controller for changing an operating mode to said power saving mode independently of an input signal from said computer device when said illuminance value is lower than a predetermined illuminance value; and a luminance value display unit that produces an on-screen display showing said illuminance value detected by said illuminance sensor and said predetermined illuminance value on said display device.

2. The display device according to claim 1, further comprising means for setting said predetermined illuminance value at any value, said predetermined illuminance value being used by said controller for comparison with said illuminance value detected by said illuminance sensor.

3. The display device according to claim 1, wherein said controller includes means for disabling or enabling a control function which changes the operating mode to said power saving mode in accordance with the illuminance of the environment in which said display device is placed.

4. The display device according to claim 1, further comprising:

a blacklight unit turned ON in said normal mode; and a display panel provided on the front of said backlight unit, wherein said controller turns OFF said backlight unit in said power saving mode.

5. The display device according to claim 4, wherein said display panel includes a liquid crystal panel.

* * * * *